US010671728B2

(12) United States Patent
Jung et al.

(10) Patent No.: US 10,671,728 B2
(45) Date of Patent: Jun. 2, 2020

(54) MOBILE DEVICE FOR ANALYZING MALICIOUS CODE USING A CONTAINER PLATFORM, SYSTEM FOR ANALYZING MALICIOUS CODE IN A MOBILE DEVICE USING THE SAME, AND METHOD FOR ANALYZING MALICIOUS CODE USING THE SAME

(71) Applicant: Foundation of Soongsil University-Industry Cooperation, Seoul (KR)

(72) Inventors: Souhwan Jung, Seoul (KR); Ngoc-Tu Chau, Seoul (KR); Jungsoo Park, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 35 days.

(21) Appl. No.: 15/631,780

(22) Filed: Jun. 23, 2017

(65) Prior Publication Data
US 2018/0204001 A1 Jul. 19, 2018

(30) Foreign Application Priority Data
Jan. 19, 2017 (KR) .......................... 10-2017-0008996

(51) Int. Cl.
*G08B 23/00* (2006.01)
*G06F 12/16* (2006.01)
(Continued)

(52) U.S. Cl.
CPC ............ *G06F 21/566* (2013.01); *G06F 21/53* (2013.01); *G06F 21/56* (2013.01); *G06F 21/561* (2013.01); *H04L 63/14* (2013.01)

(58) Field of Classification Search
CPC ........ G06F 21/566; G06F 21/53; G06F 21/56; G06F 21/561; H04L 63/14
(Continued)

(56) References Cited

U.S. PATENT DOCUMENTS 9,830,449 B1 * 11/2017 Wagner .................... G06F 21/53
2010/0122343 A1 * 5/2010 Ghosh ...................... G06F 21/55
726/23

(Continued)

FOREIGN PATENT DOCUMENTS

KR 10-2011-0084693 A 7/2011
KR 10-2012-0046807 A 5/2012
(Continued)

OTHER PUBLICATIONS

Xinwen Zhang; Securing Elastic Applications on Mobile Devices for Cloud Computing; ACM; p. 127-134 (Year: 2009).*

*Primary Examiner* — Monjur Rahim
(74) *Attorney, Agent, or Firm* — Novick, Kim & Lee, PLLC; Sang Ho Lee

(57) ABSTRACT

A mobile device having a system for analyzing malicious code is provided. The mobile device includes a container agent generating at least one Android container executing Android malicious code for dynamic analysis in response to a request received from a cloud controller and checking a state of the at least one Android container, a Linux host, a hardware module containing an operating system (OS) for the Linux host, and an analysis agent detecting a problem occurring upon an operation of the Android malicious code in the at least one Android container through the Linux host, and transmitting information of kernel-related malicious code behavior to an analysis server.

9 Claims, 4 Drawing Sheets

(51) Int. Cl.
*G06F 12/14* (2006.01)
*G06F 11/00* (2006.01)
*G06F 21/56* (2013.01)
*G06F 21/53* (2013.01)
*H04L 29/06* (2006.01)

(58) Field of Classification Search
USPC .......................................................... 726/24
See application file for complete search history.

(56) References Cited

U.S. PATENT DOCUMENTS

| | | | |
|---|---|---|---|
| 2016/0088019 A1* | 3/2016 | Li | G06F 21/53 |
| | | | 726/1 |
| 2016/0099963 A1* | 4/2016 | Mahaffey | H04L 63/0227 |
| | | | 726/25 |
| 2017/0031737 A1* | 2/2017 | Raman B R | H04L 9/3226 |
| 2018/0150308 A1* | 5/2018 | Tian | G06F 13/38 |
| 2018/0203995 A1* | 7/2018 | Yuen | G06F 21/556 |

FOREIGN PATENT DOCUMENTS

| | | |
|---|---|---|
| KR | 10-2014-0037442 A | 3/2014 |
| KR | 10-1386605 B1 | 4/2014 |
| KR | 10-2015-0099440 A | 8/2015 |
| KR | 10-1626067 B1 | 5/2016 |

\* cited by examiner

MOBILE DEVICE FOR ANALYZING MALICIOUS CODE USING A CONTAINER PLATFORM, SYSTEM FOR ANALYZING MALICIOUS CODE IN A MOBILE DEVICE USING THE SAME, AND METHOD FOR ANALYZING MALICIOUS CODE USING THE SAME

CROSS-REFERENCE TO RELATED APPLICATION

This application claims priority to and the benefit of Korean Patent Application No. 10-2017-0008996, filed on Jan. 19, 2017, the disclosure of which is incorporated herein by reference in its entirety.

BACKGROUND

The present disclosure relates to a mobile device for analyzing malicious code using a container platform, a system for analyzing malicious code in a mobile device, and a method for analyzing malicious code using a container platform, and more particularly, to a design for a mobile analysis using the Linux container technology. The "Linux," as a well known trademark, refers to open-source software operating systems built around the Linux kernel.

Many bypass techniques using anti-emulator technology have been developed for Android malicious code analysis platforms, such as Android virtual device (AVD) that is a virtualization platform and Android X86 run in a quick emulator (QEMU)-based emulator. The "Android," as a well known trademark, refers to a mobile operating system based on a modified version of the Linux kernel.

The anti-emulator technology does not only distinguish between actual mobile hardware and emulated hardware information but also determines whether eight sensor functions are provided for the distinguishment. In order to prevent such an anti-emulator, using an actual mobile device requires much cost to analyze a large amount of Android applications (apps) and also is inefficient.

Representatively, bare-metal, a real device with automation tools, an Intel-based Android version, and Virtualbox/VMware are being used.

Representative examples of bare-metal include AVD, Bluestack, AMIDuOS, Nox, and so on. QEMU is an emulator and a virtualization tool that may be used to virtualize hardware of an Android virtual device, and an emulator may configure a virtual environment through QEMU.

A real device with automation tools makes it possible to execute all application programs without a problem of compatibility and thus is an effective method of conducting an Android application analysis. Since technology for bypassing an emulator environment develops with intellectualization of malicious code, a real device with automation tools ensures a safest analysis. However, there is a drawback of degraded efficiency.

An Intel-based Android version may be executed not only in a mobile device but also in a laptop computer and a personal computer (PC). There is an Android-x86 type, such as RemixOS. An intel-based Android version is provided as an ISO file and may be executed in a virtualization tool, such as Virtualbox or VMware.

However, an existing Android malicious code analysis has the following problems.

Intelligent malicious code examines an emulator environment in various ways, such as a basic method of checking virtual environment information, a method of examining a build environment, equipment, and hardware information, and other methods (e.g., checking whether there is/dev/qemu_pipe or /dev/socket/qemud or checking qemu information using a getdrop command). Since some apps do not operate in a rooted environment, it is difficult to analyze the apps on the basis of QEMU.

Further, an app analysis in a real Android device provides better results, but it is difficult to automate pre-analysis and post-analysis processes. Also, since it is difficult to enhance expandability and flexibility by applying an app analysis in a real Android device to a cloud environment, an app analysis in a real Android device is not appropriate for an analysis environment.

SUMMARY OF THE DISCLOSURE

According to one of embodiment of the president disclosure, a mobile device for analyzing malicious code using a container platform is provided. The mobile device includes a container agent generating at least one Android container executing Android malicious code for dynamic analysis in response to a request received from a cloud controller and checking a state of the at least one Android container, a Linux host, a hardware module containing an operating system (OS) for the Linux host, and an analysis agent detecting a problem occurring upon an operation of the Android malicious code in the at least one Android container through the Linux host, and transmitting information of kernel-related malicious code behavior to an analysis server. The cloud controller manages the at least one Android container through the container agent.

The mobile device further includes a monitoring server coupled to the container agent and monitoring the state of the at least one Android container and resolving an analysis collision therein.

The mobile device further includes the analysis server performing a dynamic analysis and a static analysis on the information of kernel-related malicious code behavior from the analysis agent, and generating an Android package kit (APK) installation instruction to the at least one Android container.

The mobile device further includes a private picocell network providing a mobile network function to the at least one Android container. The private picocell network includes a software-defined radio (SDR)-based radio frequency (RF) transceiver, a picocell platform operating as a personal mobile network which is accessible with a global system for mobile communication (GSM) and/or long term evolution (LTE) module, and a management server collecting GSM/LTE information from the picocell platform and detecting malicious behavior or watching a problem of the personal mobile network.

According to another embodiment of the present disclosure, a system for analyzing malicious code in a mobile device is provided. The system includes a container agent generating at least one Android container executing Android malicious code for dynamic analysis in response to a request received from a cloud controller and checking a state of the at least one Android container, a Linux host, a hardware module containing an operating system (OS) for the Linux host, and an analysis agent detecting a problem occurring upon an operation of the Android malicious code in the at least one Android container through the Linux host, and transmitting information of kernel-related malicious code behavior to an analysis server. The cloud controller manages the at least one Android container through the container agent.

According to the other embodiment of the present disclosure, a method for analyzing malicious code using a container platform is provided. The method includes generating, by a container agent, at least one Android container executing Android malicious code for dynamic analysis in response to a request received from a cloud controller, identifying a problem occurring upon an operation of the Android malicious code in the at least one Android container through a Linux host, detecting and transmitting, by an analysis agent, information of kernel-related malicious code behavior to an analysis server, and collecting analysis information from the analysis server.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
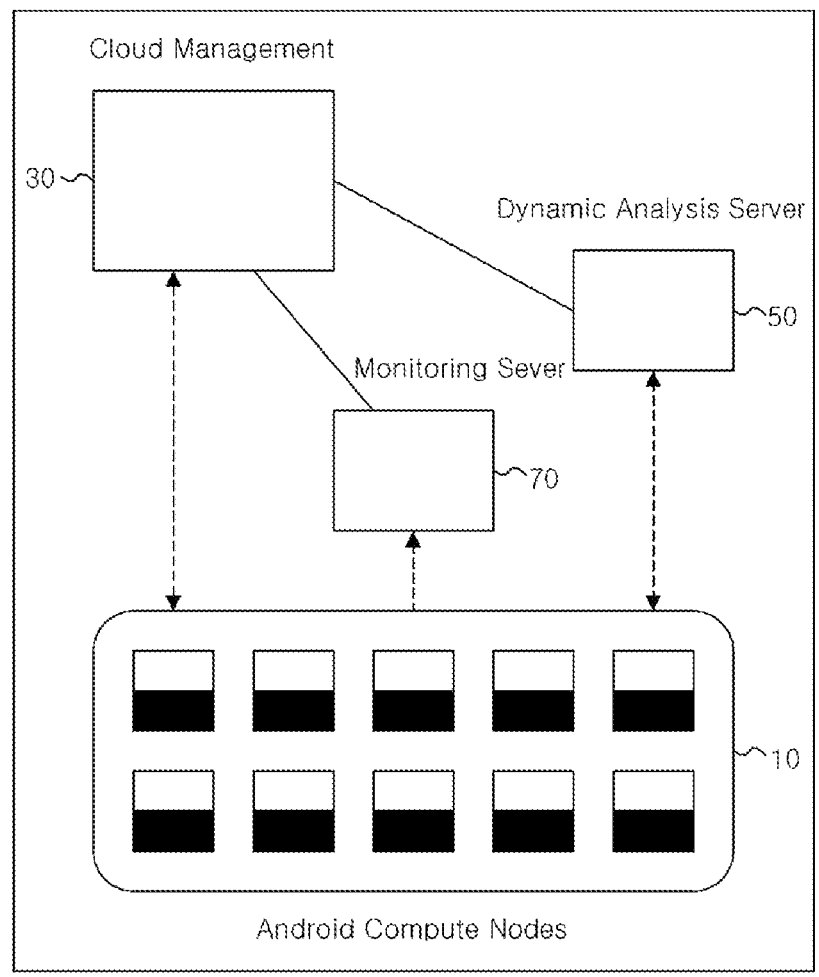
FIG. 1 is a conceptual diagram of a container platform for analyzing Android malicious code according to an exemplary embodiment of the present disclosure.

The following detailed description of the present disclosure refers to the accompanying drawings which show, by way of illustration, exemplary embodiments in which this disclosure may be practiced. These embodiments are described in sufficient detail to enable those of ordinary skill in the art to practice the present disclosure. Various embodiments of the present disclosure are to be understood as being different but not necessarily as being mutually exclusive. For example, where a particular shape described, the structure and properties can be made in the context of an embodiment implemented in other embodiments without departing from the spirit and scope of the disclosure. In addition, the individual components within each disclosed embodiment or position are to be understood as being an arrangement that can be changed without departing from the spirit and scope of the disclosure. Therefore, the description is not to be taken as limiting to the scope of the present disclosure, and instead the scope of the present disclosure is limited only by the appended claims along with the full range equal to those claims. In the drawings, similar reference symbols denote the same or similar functionality throughout the various aspects.

Hereinafter, exemplary embodiments of the present disclosure will be described in detail with reference to the drawings.

Figure 2:
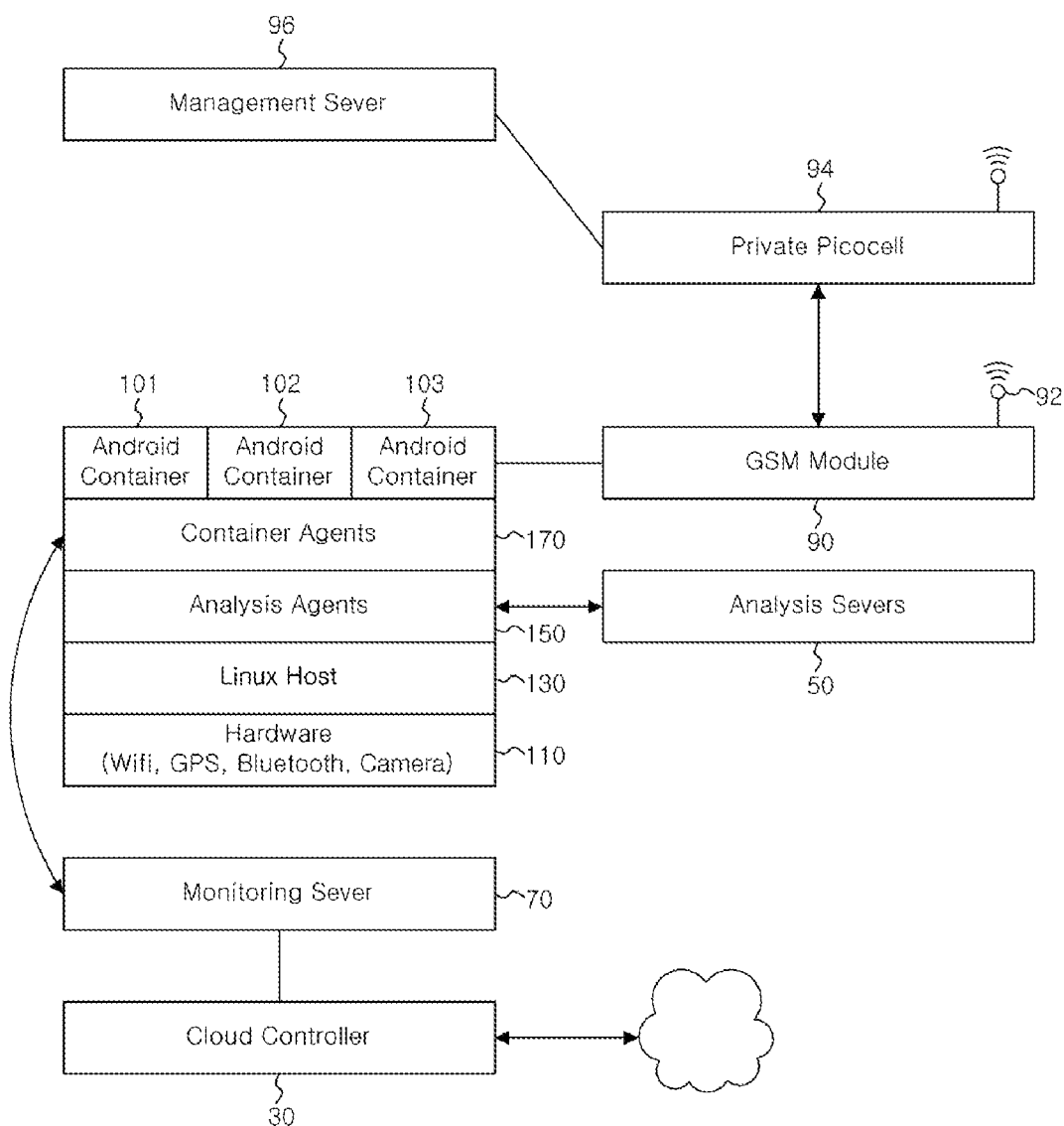
FIG. 2 is a detailed block diagram of the container platform for analyzing Android malicious code shown in FIG. 1.
Figure 3:
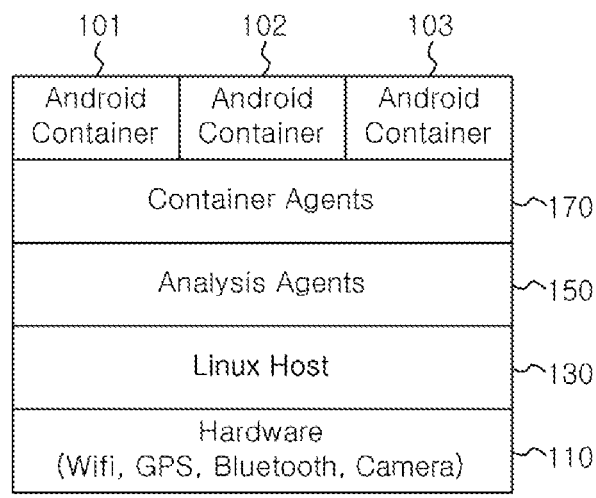
FIG. 3 is a block diagram of an Android compute node of FIG. 2.

FIG. 1 is a conceptual diagram of a container platform for analyzing Android malicious code according to an exemplary embodiment of the present disclosure. FIG. 2 is a detailed block diagram of the container platform for analyzing Android malicious code shown in FIG. 1. FIG. 3 is a block diagram of an Android compute node of FIG. 2.

A container platform 1 for analyzing Android malicious code (referred to as "container platform" below) according to an exemplary embodiment of the present disclosure is a platform for analyzing Android malicious code on the basis of a container technique.

Specifically, the present disclosure proposes a platform that provides higher speed than a virtualization-based method and is more flexible than a mobile device-based method as a new analysis and monitoring platform for analyzing mobile malicious code.

Exemplary embodiments of the present disclosure employ Android containers for analyzing Android applications instead of employing existing solutions, such as quick emulator (QEMU)-based emulator, Android-x86, and a real mobile device.

Referring to FIG. 1, the container platform 1 according to an exemplary embodiment of the present disclosure includes Android compute nodes 10, a cloud controller 30, an analysis server 50, and a private picocell network (see FIG. 2).

The Android compute nodes 10 serve to generate Android containers and collect analysis information from the Android container and a container host. The Android compute nodes 10 manage all the generated Android containers.

The cloud controller 30 connects the Android compute nodes 10 and manages the Android containers.

The analysis server 50 performs a dynamic analysis and/or a static analysis of Android malicious code and instructs the Android container to install the Android package kit (APK).

The monitoring server 70 collects information sent by monitoring agents running on the Android compute nodes 10 to monitor a state of each Android container, and resolves analysis collision and other problems of the Android compute nodes 10.

The private picocell network provides a mobile network function to the Android containers.

Components of the container platform 1 of FIG. 1 and a relationship among the components will be described in further detail with reference to FIG. 2. In FIGS. 2 and 3, one of the Android compute nodes 10 will be representatively described.

Referring to FIGS. 2 and 3, the Android compute node 10 includes a container agent 170, a hardware module 110, a Linux host 130, and an analysis agent 150.

The Android compute node 10 may be a terminal or some modules of each mobile device. Also, the container agent 170, the hardware module 110, the Linux host 130, and the analysis agent 150 may be formed as an integrated module or as one or more modules. On the contrary, the respective components may be formed as separate modules.

The mobile device may be an Android device and may include various forms of mobile devices capable of wireless communication, such as a smart phone, a cellular phone, a tablet computer, a laptop computer, a netbook, a personal digital assistant (PDA), a portable multimedia player (PMP), a PlayStation portable (PSP), a moving picture experts group (MPEG) layer 3 (MP3) player, an e-book reader, a navigation device, a smart camera, an electronic dictionary, an electronic watch, a game machine, and so on.

The mobile device has mobility and may be referred to by other terms, such as a device, an apparatus, a terminal, user equipment (UE), a mobile station (MS), a wireless device, a handheld device, and so on.

The mobile device may execute various application programs on the basis of an operating system (OS). The OS is a system program for application programs to use hardware of a terminal device, and exemplary embodiments of the present disclosure may be based on the Android OS.

The application programs are programs developed to perform particular tasks using a mobile device and may not only include various applications, tools, process and service objects but also include various multimedia content, such as a game, a video, a photograph, etc., and all player programs for playing the multimedia content, such as an image viewer, a video player, and so on.

The mobile device may display media data or provide a user interface (UI) to a user through a display section which is a display device supporting wireless communication.

The display section may include a liquid crystal display (LCD) panel, a plasma display panel (PDP), an organic light-emitting diode (OLED) display panel, and so on.

Also, a touch screen function may be included in the display section or provided to a separate touchpad device to process user input. Alternatively, the mobile device may include an input section (not shown), such as a keypad, etc., which is formed separately from the display section to receive an input of the user.

The container agent 170 generates one or more Android containers 101, 102, and 103 that directly execute Android malicious code for dynamic analysis in response to a request received from the cloud controller 30.

Also, the container agent 170 makes it possible to check states of the Android containers 101, 102, and 103 through connections between the cloud controller 30 and the Android containers 101, 102, and 103.

The Android containers 101, 102, and 103 may be plural in number and are designed to execute Android malicious code for dynamic analysis. The states of the Android containers 101, 102, and 103 may be generated differently according to an OS, a build version, a routine, a rooting state, hardware information, and so on.

Container technology is a packaging technology for bundling up an application and elements required to execute the application on the basis of OS virtualization. Since it is possible to run several containers or move a container to another operating environment and run the container, an application may be easily run and extended.

Another reason for the rapid emergence of the container technology is that it helps the so-called "DevOps" that bridge the gap between development and operations. In many cases, a problem occurs in a process of transferring and deploying a system created by a developer to operating environments, and a startup time of the system is delayed. Using a container enables to implant a packaged application in an operating environment as it is and execute the application.

Accordingly, a developer may further concentrate on development, and an administrator may easily deploy and manage a system. An information technology (IT) architect may scale infrastructure flexibly as necessary while reducing errors during testing and deployment of a system.

Container technology is very advantageous in terms of deployment rate and performance. A container has an about ten times degree of integration than that of a virtual machine (VM). While ten VMs are installed in one server according to the related art, 100 or more containers may be managed by one server. This is because there is neither a hypervisor layer nor a VM OS layer and fewer physical resources are used.

It is generally known that the hypervisor layer and the VM OS layer use about 10 □ to about 20% of entire resources in a virtual environment. In a physical server, it generally takes about 27 hours to build an operating environment. In a VM, it takes about 12 minutes to use the template function. On the other hand, it takes only about ten seconds to create a new container instance.

Also, container technology makes it possible to build a new environment faster than virtualization technology and may further reduce time required to build a new environment. Moreover, while a VM requires a manual task of loading data and causing a system to operate in conjunction with another system after building an environment, using a container makes it possible to omit such a task by inputting the task into a container image and thus is efficient.

Container technology has many advantages in terms of performance. Container technology involves a structure obtained by installing a host OS on hardware and stacking a container which is a package of an application and a library on the host OS.

In an existing bear-metal environment, when a problem occurs in a secure socket layer (SSL) library, problems immediately occur in all applications related to the SSL library. This is because of the structure in which a single library is shared. On the other hand, according to container technology, internal libraries are used according to containers. Therefore, even when a failure occurs in one container, other services are not affected.

Figure 4:
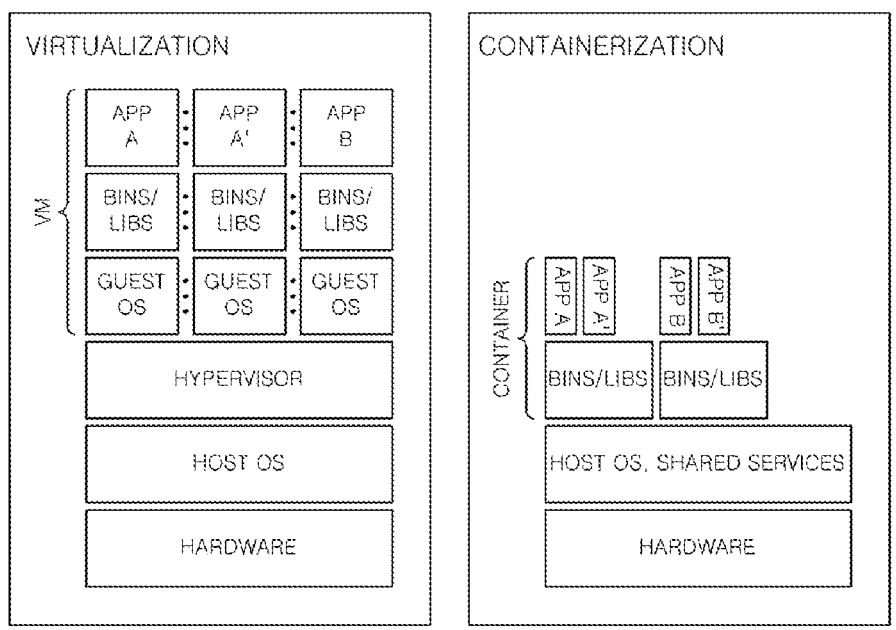
FIG. 4 is a diagram illustrating container technology used in the present disclosure and virtualization technology in comparison with each other.

When comparing container technology with virtualization technology, the biggest advantage of container technology is scalability which is applicable where real-time quickness and response are needed. Referring to FIG. 4, virtualization generally extends in a scale-up fashion by additionally allocating resources to a VM short of resources. On the other hand, containers are managed in a scale-out fashion by additionally generating and running a container which plays the same role as an existing container.

In the scale-out fashion, it is possible to cope with a failure or a service expansion more flexibly. A container is so light and flexible that generating and running a new container is faster than recovering an existing container when a failure occurs.

The hardware module 110 is installed in the Android compute node and provides hardware-based functions of the mobile device, such as wireless fidelity (WiFi), global positioning system (GPS), Bluetooth, camera, and global system for mobile communication (GSM) connection functions.

An OS of the Linux host 130 is installed on the hardware module 110, and the analysis agent 150 identifies a problem occurring upon operation of malicious code in the Android containers 101, 102, and 103 through the Linux host 130, detects kernel-related malicious code behavior, and transmits information on the kernel-related malicious code behavior to the analysis server 50.

The cloud controller 30 is used to manage and configure the Android containers 101, 102, and 103 through the container agent 170.

The analysis server 50 receives the information sent by the analysis agent 150 and detects a problem through a dynamic analysis and a static analysis of the malicious code. Also, the analysis server 50 instructs the Android containers 101, 102, and 103 to install APK.

The monitoring server 70 is connected to the container agent 170 to monitor states of the Android containers 101, 102, and 103 and resolves analysis collision and other problems of the Android compute node 10.

The private picocell network provides a mobile network function to the Android containers 101, 102, and 103.

The private picocell network may include a software-defined radio (SDR)-based RF transceiver 92 which uses a GSM module 90, a picocell platform 94 which operates as a personal mobile network accessible with a GSM/long term evolution (LTE) module, and a management server 96 which collects GSM/LTE information from the picocell platform 94 and detects malicious behavior or watches a problem of the personal mobile network.

According to the above-described container platform 1 for analyzing Android malicious code, since the container technology is used, hardware virtualization technology such as the existing QEMU technology is unnecessary. Also, unlike a case of executing Android malicious code in a real phone, various kinds of equipment are not required, and it is possible to provide expandability and flexibility.

Further, when malicious code is analyzed in an Android container according to exemplary embodiments of the present disclosure, it is possible to analyze APK and .so libraries in the Android space. Also, since the container may be easily backed up, it is possible to simply recover the container from various attacks.

Moreover, since information is directly acquired from real hardware, exemplary embodiments of the present disclosure provide higher speed than a virtual environment and make it possible to prepare for an emulator bypassing technique. In addition, since a picocell network is used in exemplary embodiments of the present disclosure, it is possible to cope with an attack through a real mobile network, and it is also possible to create a private network among containers.

Figure 5:
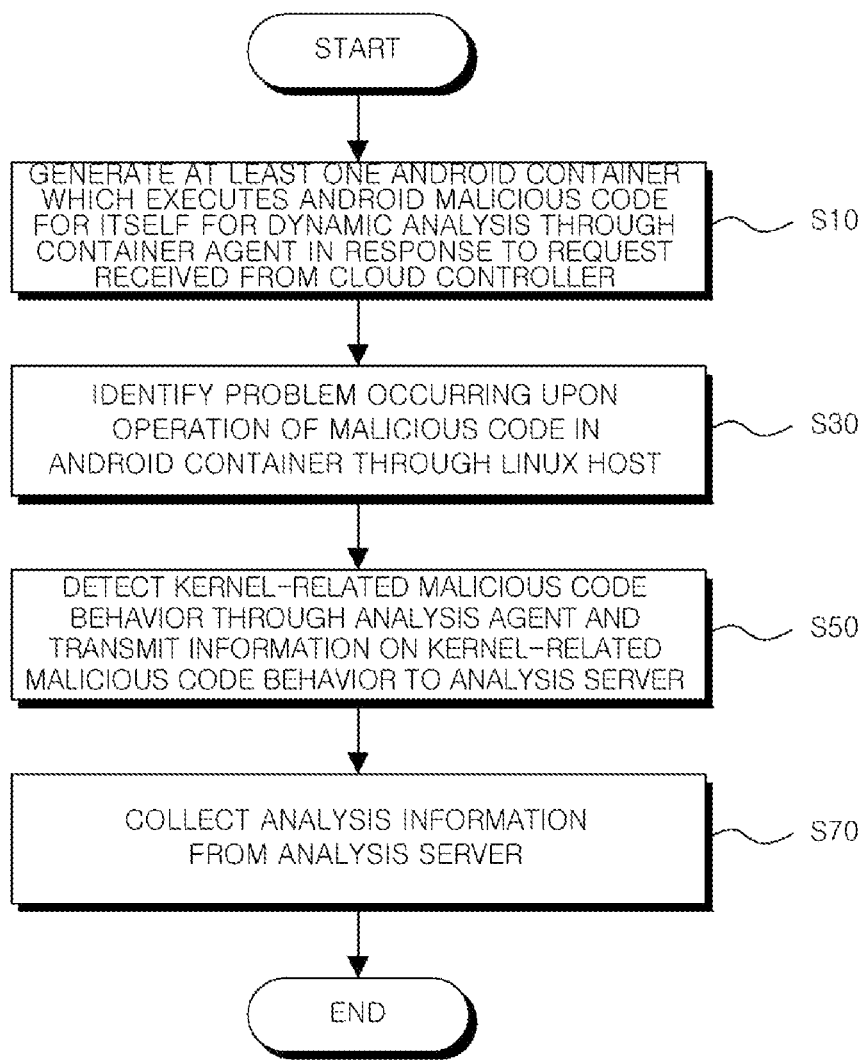
FIG. 5 is a flowchart of a method of securing a mobile device using a container platform for analyzing Android malicious code according to an exemplary embodiment of the present disclosure.

FIG. 5 is a flowchart of a method of securing a mobile device using a container platform for analyzing Android malicious code according to an exemplary embodiment of the present disclosure.

The method of securing a mobile device using a container platform for analyzing Android malicious code according to the present embodiment may proceed in substantially the same configuration as that of the Android compute node 10 of FIG. 3 in the environment of the container platform 1 of FIG. 2.

Therefore, in the environment of the container platform 1 of FIG. 2, the same components as those of the Android compute node 10 of FIG. 3 will be given the same reference numerals, and duplicate descriptions will be omitted.

The method of securing a mobile device using a container platform for analyzing Android malicious code according to the present embodiment may be performed by software (an application) for performing the method.

Referring to FIG. 5, the method of securing a mobile device using a container platform for analyzing Android malicious code according to the present embodiment involves generating, by the container agent 170 of the Android compute node 10, one or more Android containers 101, 102, and 103 which execute Android malicious code for dynamic analysis in response to a request received from the cloud controller 30 (operation S10).

The cloud controller 30 manages and configures the Android containers 101, 102, and 103 through the container agent 170. The Android containers 101, 102, and 103 may be plural in number and are designed to execute Android malicious code for dynamic analysis.

The states of the Android containers 101, 102, and 103 may be generated differently according to an OS, a build version, a routine, a rooting state, hardware information, and so on.

When the Android containers 101, 102, and 103 are generated, a problem occurring upon operation of malicious code in the Android containers 101, 102, and 103 is identified through the Linux host 130 (operation S30). An OS of the Linux host 130 is installed on the hardware module 110.

The analysis agent 150 detects Kernel-related malicious code behavior and transmits information on the kernel-related malicious code behavior to the analysis server 50 (operation S50). The analysis server 50 receives the information sent by the analysis agent 150 and detects a problem through a dynamic analysis and/or a static analysis of the malicious code. Also, the analysis server 50 may instruct the Android containers 101, 102, and 103 to install an APK.

The analysis agent 150 of the Android compute node 10 collects analysis information from the analysis server 50 (operation S70).

The container agent 170 may transmit state information of the Android containers 101, 102, and 103 to the monitoring server 70. The monitoring server 70 may be connected to the container agent 170 to monitor the states of the Android containers 101, 102, and 103 and may resolve an analysis collision of the Android compute node 10 and other problems.

The above-described method of securing a mobile device equipped with a container platform for analyzing Android malicious code may be embodied in the form of an application or program instructions executable by various computer components and recorded in a computer-readable recording medium. The computer-readable recording medium may include program instructions, data files, data structures, or the like, solely or in combination.

The program instructions recorded in the computer-readable recording medium may be specially designed or configured for the present disclosure or may be known to and used by those of ordinary skill in the computer software art.

Examples of the computer-readable recording medium include magnetic media such as a hard disk, a floppy disk, and a magnetic tape, optical recording media such as a compact disc read-only memory (CD-ROM) and a digital versatile disc (DVD), magneto-optical media such as a floptical disk, and hardware devices such as a ROM, a random access memory (RAM), a flash memory, etc. specially configured to store and execute the program instructions.

Examples of the program instructions include a high-level language code executable by a computer using an interpreter or the like as well as a machine language code created by a compiler. The hardware devices may be configured to operate as one or more software modules to perform processing according to the present disclosure, and vice versa.

According to the above-described container platform for analyzing Android malicious code, container technology is used, and the hardware virtualization technology, such as existing QEMU technology, is unnecessary. Also, unlike a case of executing Android malicious code in a real phone, various kinds of equipment are not required, and it is possible to provide expandability and flexibility.

Further, when malicious code is analyzed in an Android container according to exemplary embodiments of the present disclosure, it is possible to analyze APK and .so libraries in the Android space. Also, since the container may be easily backed up, it is possible to simply recover the container from various attacks.

Moreover, since information is directly acquired from real hardware, exemplary embodiments of the present disclosure provide higher speed than a virtual environment and make it possible to prepare for an emulator bypassing technique. In addition, since a picocell network is used in exemplary embodiments of the present disclosure, it is possible to cope with an attack through a real mobile network, and it is also possible to create a private network among containers.

The present disclosure proposes a platform for analyzing Android malicious code using container technology and shows high stability and flexibility in an Android device. Therefore, the present disclosure is expected to be usefully applied to analyses of Android malicious code.

It should be apparent to those of ordinary skill in the art that various modifications and alterations can be made to the above-described exemplary embodiments of the present disclosure without departing from the spirit or scope of the disclosure.

What is claimed is:

1. A mobile device for analyzing malicious code using a container platform, the mobile device comprising:
    a container agent generating at least one container directly executing malicious code for dynamic analysis in response to a request received from a cloud controller and checking a state of the at least one container;
    a host;
    a hardware module containing an operating system (OS) for the host; and
    an analysis agent detecting a problem occurring upon an operation of the malicious code in the at least one container through the host, and transmitting information of kernel-related malicious code behavior to an analysis server,
    wherein the analysis server performs a dynamic analysis and a static analysis on the information of kernel-related malicious code behavior received from the analysis agent, and generates a package kit file installation instruction to the at least one container to install the package kit, and
    wherein the container agent is coupled to a monitoring server, which monitors the state of the at least one container and resolves an analysis collision thereof.

2. The mobile device of claim 1, wherein the cloud controller manages the at least one container through the container agent.

3. The mobile device of claim 1, further comprising a private picocell network providing a mobile network function to the at least one container.

4. The mobile device of claim 3, wherein the private picocell network comprises:
    a software-defined radio (SDR)-based radio frequency (RF) transceiver;
    a picocell platform operating as a personal mobile network which is accessible with a global system for mobile communication (GSM) and/or long term evolution (LTE) module; and
    a management server collecting GSM/LTE information from the picocell platform and detecting malicious behavior or watching a problem of the personal mobile network.

5. A system for analyzing malicious code in a mobile device using a container platform comprising:
    a container agent generating at least one container directly executing malicious code for dynamic analysis in response to a request received from a cloud controller and checking a state of the at least one container;
    a host;
    a hardware module containing an operating system (OS) for the host;
    an analysis agent detecting a problem occurring upon an operation of the malicious code in the at least one container through the host, and transmitting information of kernel-related malicious code behavior to an analysis server,
    wherein the analysis server performs a dynamic analysis and a static analysis on the information of kernel-related malicious code behavior received from the analysis agent, and generates a package kit file installation instruction to the at least one container to install the package kit; and
    a monitoring server to monitor the state of the at least one container and to resolve an analysis collision therein, wherein the monitoring server is coupled to the container agent.

6. The system of claim 5, wherein the cloud controller manages the at least one container through the container agent.

7. The system of claim 5, further comprising a private picocell network providing a mobile network function to the at least one container.

8. The system of claim 7, wherein the private picocell network comprises:
    a software-defined radio (SDR)-based radio frequency (RF) transceiver;
    a picocell platform operating as a personal mobile network which is accessible with a global system for mobile communication (GSM) and/or long term evolution (LTE) module; and
    a management server collecting GSM/LTE information from the picocell platform and detecting malicious behavior or watching a problem of the personal mobile network.

9. A method for analyzing malicious code using a container platform, the method comprising:
    generating, by a container agent, at least one container directly executing malicious code for dynamic analysis in response to a request received from a cloud controller;
    identifying a problem occurring upon an operation of the malicious code in the at least one container through a host;
    detecting and transmitting, by an analysis agent, information of kernel-related malicious code behavior to an analysis server;
    performing, by the analysis server, a dynamic analysis and a static analysis on the information of kernel-related malicious code behavior received from the analysis agent;
    installing a package kit file in the at least one container according to an instruction of the analysis server;
    transmitting state information of the at least one container to a monitoring server; and
    monitoring the state of the at least one container and resolving an analysis collision thereof using the monitoring server.

* * * * *